US007632399B2

(12) United States Patent
Geppert et al.

(10) Patent No.: US 7,632,399 B2
(45) Date of Patent: Dec. 15, 2009

(54) FLUID TREATMENT SYSTEM AND METHOD

(76) Inventors: Carl F. Geppert, 10983-E Guilford Rd., Annapolis Junction, MD (US) 20701; Theodore R. Geppert, 10983-E Guilford Rd., Annapolis Junction, MD (US) 20701; Robert A. Rhoades, 10983-E Guilford Rd., Annapolis Junction, MD (US) 20701

( * ) Notice: Subject to any disclaimer, the term of this patent is extended or adjusted under 35 U.S.C. 154(b) by 511 days.

(21) Appl. No.: 10/965,713

(22) Filed: Oct. 18, 2004

(65) Prior Publication Data

US 2006/0081519 A1 Apr. 20, 2006

(51) Int. Cl.
*C02F 1/74* (2006.01)

(52) U.S. Cl. ......................... 210/127; 210/205; 222/67; 261/64.5

(58) Field of Classification Search ................. 340/624; 210/127, 121, 123, 205, 760, 192; 222/394, 222/67; 73/305, 306, 319; 200/84 C; 261/64.5; 137/165, 409–451, 206, 209
See application file for complete search history.

(56) References Cited

U.S. PATENT DOCUMENTS 1,976,129 A * 10/1934 Johnson ....................... 60/415
3,710,613 A * 1/1973 Innes et al. ................. 335/205
4,083,661 A 4/1978 McPherson et al.
4,101,608 A * 7/1978 Bracey ...................... 261/36.1
4,309,285 A 1/1982 Gallaher, Sr.
4,492,631 A 1/1985 Martin
5,141,404 A 8/1992 Newcomer et al.
5,397,461 A 3/1995 Augustin
5,614,086 A 3/1997 Hill et al.
5,705,056 A 1/1998 Scragg
5,803,982 A * 9/1998 Kosofsky et al. .............. 134/10
6,063,295 A 5/2000 Williams
6,080,306 A 6/2000 Falkner
6,315,893 B1 11/2001 Sawada
6,481,456 B1 11/2002 Falkner
6,627,070 B1 9/2003 Frank
2003/0164337 A1* 9/2003 Maas et al. ................. 210/721
2004/0007537 A1 1/2004 Gasvoda

* cited by examiner

*Primary Examiner*—Terry K Cecil
(74) *Attorney, Agent, or Firm*—Oliff & Berridge, PLC

(57) ABSTRACT

A fluid treatment system, includes a pressurizable tank, a compressed air source, and a float disposed inside the tank, the float rising or falling in response to a level of fluid in the tank; and a float-actuated switch assembly connected to the float. The float-actuated switch assembly starts introduction of compressed air into the tank from the compressed air source. A purge valve may be provided to allow fluid to flow out of the tank during the introduction of compressed air into the tank. The float-actuated switch assembly may include a magnetic switch.

14 Claims, 3 Drawing Sheets

FLUID TREATMENT SYSTEM AND METHOD

BACKGROUND OF THE INVENTION

1. Field of Invention

This invention relates to a fluid treatment system and method.

2. Description of Related Art

Contaminants such as iron may be removed from water by dissolving air in the water to facilitate precipitation of the contaminants. One way to introduce air into water is to use an air pump to create a pressurized air head in a closed water tank. The pressurized air head forces air to dissolve in the water.

As air is dissolved in the water, the air head is diminished and must be replenished. To replenish the air head, some systems control the air pump using a timer; e.g., the timer causes the air pump to operate at predetermined times, forcing a predetermined quantity of air into the tank. Other systems control the air pump using a pressure switch installed inline before or after the tank, or a flow switch that turns on the air pump when water is flowing.

SUMMARY OF THE INVENTION

A disadvantage of systems that use a timer, pressure switch or flow switch for air pump actuation is that they do not provide direct control of the air volume. During periods of high water demand, the air pocket, also referred to as "air head," may be excessively or completely diminished before the next air pump cycle starts. During periods of low demand, such as while occupants of a house are away on vacation, the air pump operates needlessly, thus wasting energy. Furthermore, in such systems, the air pump cycle typically results in excess air being forced into the tank, and the excess air therefore needs to be bled off during or after the air pump cycle. This also wastes energy, and also wastes water because water is bled out of the tank as the air pocket increases.

It would be advantageous to have a system and method in which an air pump is actuated based on the water level in the tank, or on the air level in the tank, instead of relying on a timer. This invention provides such a system and method.

In embodiments, the invention uses a float-actuated switch assembly, which directly responds to the water level in a water tank, to actuate the introduction of air into the water tank. As used herein, "air" shall encompass not only ambient air, but also any oxygen-rich gas that may be provided from a source other than ambient air, such as from a compressed oxygen-rich gas tank or the like. "Oxygen-rich gas" includes any gas that contains oxygen in an amount effective to reduce contaminants, and thus includes pure oxygen and ozone as well as atmospheric air that is compressed and stored in a tank. "Air" shall also generally encompass any gas that may be used to remove contaminants or otherwise treat a fluid. Thus, while the exemplary embodiments described below use an air pump to introduce air into the tank, the invention is equally applicable to a system in which, for example, air is introduced by controlling a valve to open in order to let compressed air flow into the tank.

These and other objects, advantages and salient features of the invention are described in or apparent from the following detailed description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF PREFERRED EMBODIMENTS

This invention uses a water level-responsive switch to initiate replenishment of pressurized air head in a fluid-containing tank. Exemplary embodiments are described in detail below.

Figure 1:
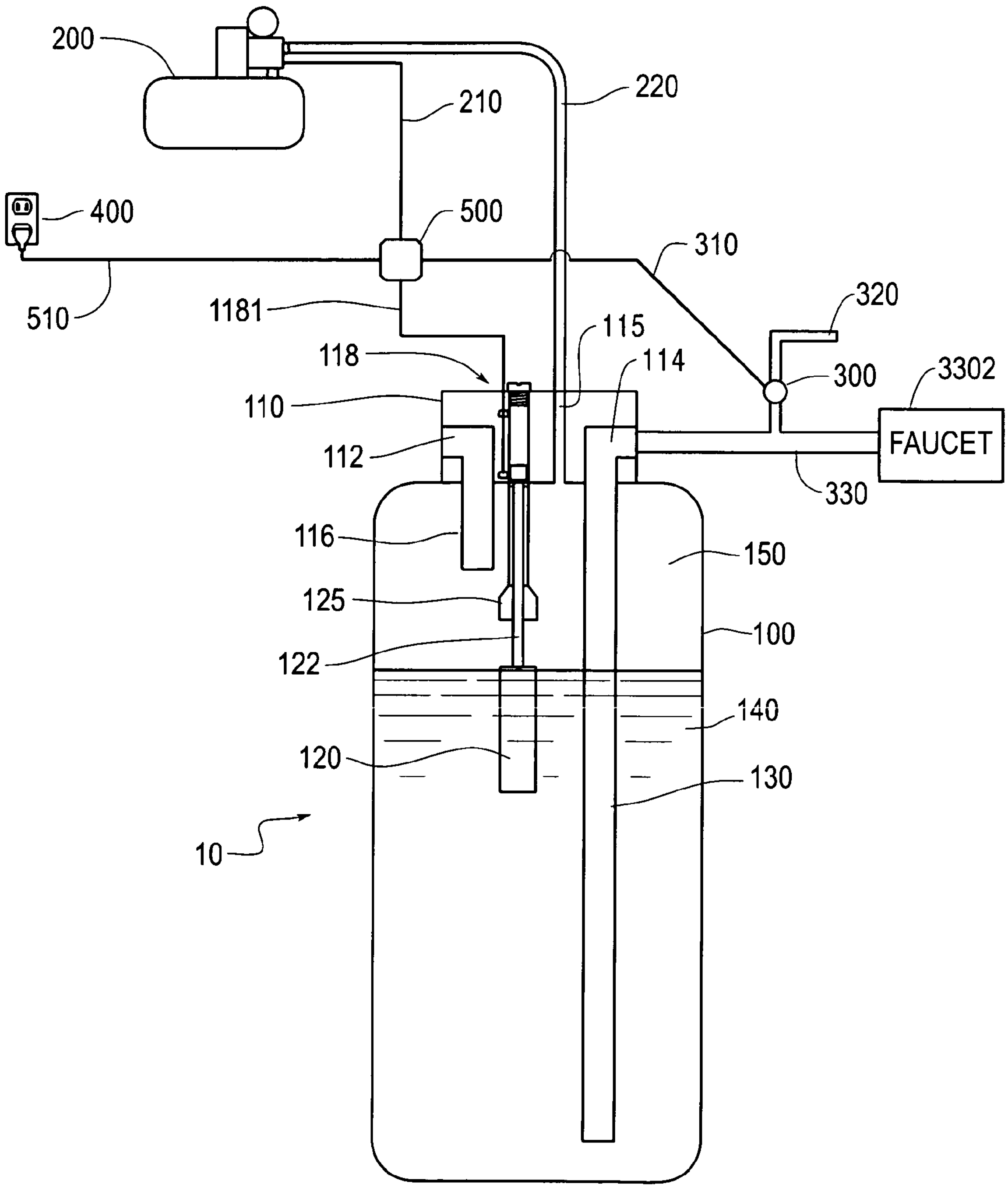
FIG. 1 illustrates an exemplary water treatment system according to the invention.

FIG. 1 illustrates an exemplary water treatment system 10 according to the invention. The system 10 includes a pressurizable water tank 100, an air pump 200, and a purge valve 300. A power source 400 supplies power to the system 10, and a power supply switch 500 is preferably provided between the power source 400 and the air pump 200. The power supply switch 500 preferably allows power to be supplied to both the air pump 200 and the purge valve 300, preferably simultaneously. Thus, in this embodiment, the power supply switch is connected to the air pump 200 via a power supply line 210, and to the purge valve 300 via a power supply line 310. The power supply switch 500 is also connected to the power source 400 via a power supply line 510.

Hereafter, it will be assumed that the power supply 400 is a standard AC power outlet, and that the air pump 200 and the purge valve 300 operate on a standard AC current. However, it will be appreciated that DC power may be used instead of AC power, if desired. For convenience in installation, the power supply lines 210, 310 and 510 may be electric cords with standard two- or three-prong plugs, and the power supply switch 500 may include two standard receptacles into which the plugs may be inserted. Alternatively, the power supply switch 500 may include a single standard receptacle, and a separate splitter (not shown) may be plugged into the receptacle.

Although the purge valve 300 and air pump 200 are depicted and described as being connectable to the same power source and controlled by the same switch device, those skilled in the art will appreciate that the purge valve 300 and air pump 200 may alternatively be connected to separate power sources, and/or may be turned on and off by separate switches. For example, signals from a switch assembly 118, described in more detail below, may be split and sent to both a switch that controls the air pump 200 and a switch that controls the purge valve 300.

The tank 100 includes a cap 110, an inlet diffuser 116, a float 120, and an outlet tube 130. Water 140 fills part of the tank, and above the water is formed a pressurized air head 150. The inlet diffuser 116 sprays and disperses water throughout the air head 150, thereby providing more water-to-air contact which provides for more effective oxidation.

The purge valve 300 may, for example, be a solenoid valve or any other type of valve that is able to be controlled based directly or indirectly on a signal from the switch assembly 118. The purge valve 300 is normally closed to prevent water from flowing through a purge line 320. When the purge valve 300 is opened, it allows water to flow through the purge line 320. The primary purpose of the purge valve 300 is to release water in order to allow more air into the tank 100. If iron is to be treated (i.e., removed from the water), a filter (not shown) is typically used as part of the system, and the purge valve 300 is preferably installed after the filter. Thereby, the purge valve 300 is always releasing aerated and/or filtered water, and therefore has less chance of being clogged or caused to malfunction by contaminants.

Accordingly, in this embodiment, when the power supply switch 500 is energized (as will be described in more detail hereafter), the air pump 200 is energized by the power supply switch 500, and the purge valve 300 is also energized by the power supply switch 500, substantially simultaneously with energization of the air pump 200. Therefore, air is forced by the air pump 200 through air inlet line 220, through the cap 110 and into the tank 100, thereby increasing the amount of air in the tank 100. At the same time, water is forced out through the outlet tube 130, through the purge valve 300 and out through the purge line 320. The purge line 320 may lead to an existing drain line, a floor drain, to the outside or to any other suitable discharge point. The flow rate through the purge line 320 is typically about 0.25-1.0 gallons per minute (gpm).

It should be appreciated that it is possible that a user may, for example, coincidentally turn on a water faucet 3302 or the like while water is flowing through the purge valve. This does not pose any problem, because water may still flow through the outlet line 330 while the purge valve 300 is open.

The cap 110 includes an inlet port 112 and an outlet port 114, connected to the inlet diffuser 116 and the outlet tube 130, respectively. The cap 110 also includes an air inlet port 115 to which the air inlet line 220 connects. A switch assembly 118, described in more detail below, is provided in the cap 110.

Although not depicted in the drawings, it is preferable that check valves, i.e., valves that allow fluid flow in one direction, but not the other, are provided in the air inlet line 220 and in a water inlet line (not shown) that connects to the inlet port 112. A check valve may also be provided after the purge valve 300 to prevent water from flowing back through the purge valve 300.

Figure 3:
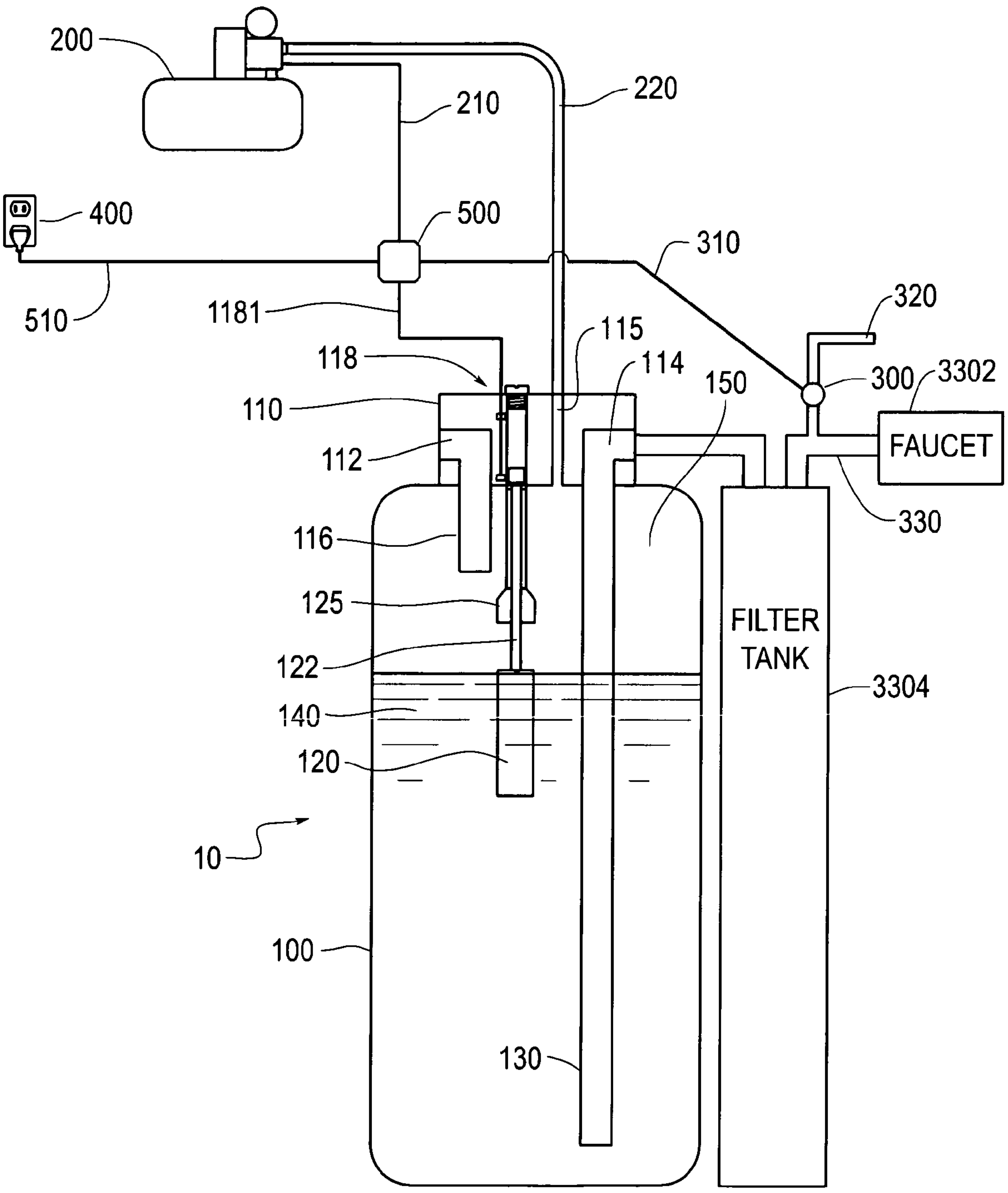
FIG. 3 illustrated another exemplary water treatment system according to the invention.

It should be appreciated that the system shown in FIG. 1 may in fact be part of a larger water treatment system including additional tanks for filtering or other processes. For example, one or more filter tanks 3304 may be provided downstream from the tank 100, to capture particulates of iron or other contaminants precipitated from the water. In such a system, the filter tank(s) 3304 would typically be positioned between the tank 100 and the purge valve 300. as shown in FIG. 3. In systems designed to treat only low levels of hydrogen sulfide, a filter tank may not be needed, and therefore the purge valve 300 would typically be positioned directly downstream from the tank 100 as shown in FIG. 1. However, it should be appreciated that the purge valve 300 may be located anywhere in the system, as long as it allows water to escape the tank 100 as air is being pumped into the air head 150. For example, the purge valve 300 could be located on the tank 100 itself. One or more filter tanks may also be installed as pre-filters before the tank 100.

Figure 2:
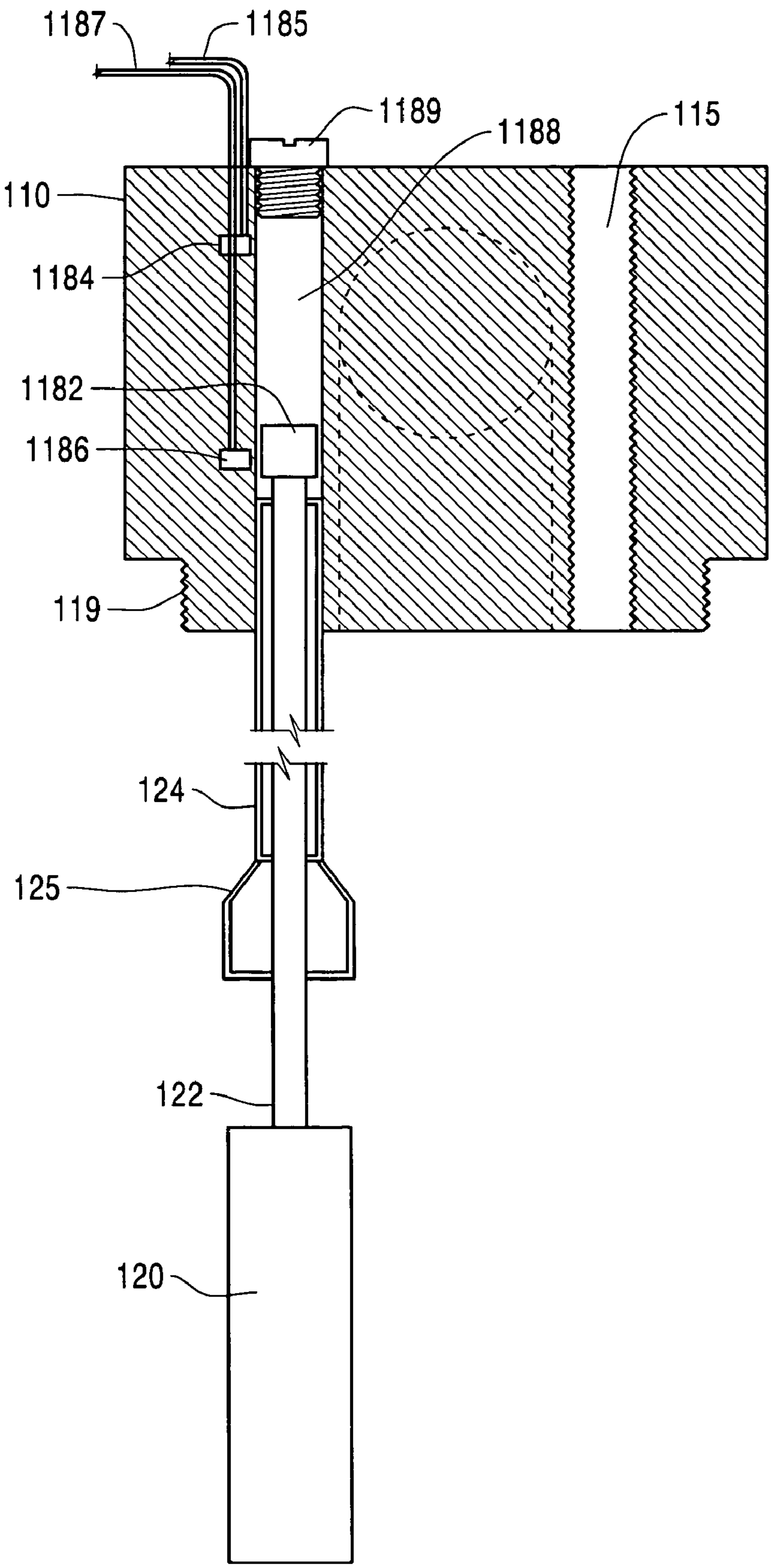
FIG. 2 illustrates an enlarged cross section of a cap and switch assembly according to the invention.

FIG. 2 shows an enlarged cross sectional view of the cap 110. As depicted, the cap 110 may include a threaded portion 119 by which it is attached to a mating threaded portion (not shown) provided in the top of the tank 100. The cap 110 may, for example, be formed of a polymeric material such as plastic or resin. In a preferred embodiment, the cap 110 is made of PVC schedule 80.

A float guide 124 may be attached to the cap 110. A float rod 122, which has a bottom end that connects to the float 120, passes through and is slidable within the float guide 124. A flared fitting 125 may be provided at the lower end of the float guide 124. The flared fitting 125 can help to reduce the possibility of the float 120 getting stuck if there are contaminants in the water that may adhere to the float rod 122.

A switch actuator 1182, which is part of the switch assembly 118 (see FIG. 1), is attached to the float rod 122 at or near an upper end of the float rod 122. The switch actuator 1182 slides up and down within an actuator passage 1188 formed in the cap 110. An air-tight seal may be formed between the float rod 122 and the bottom end of the actuator passage 1188, but this is problematic for various reasons and therefore it is preferable that the top end of the actuator passage 1188 be sealed by a threaded plug 1189 or the like, as shown, or permanently sealed by, e.g., not forming the actuator passage 1188 all the way through the cap 110 during formation of the cap 110 (that is, by forming the actuator passage 1188 as a blind bore), or by permanently affixing a cap over the actuator passage 1188 by adhesive, plastic welding or the like. By so doing, it becomes unnecessary to provide an air-tight seal between the float rod 122 and the bottom end of the actuator passage 1188. One advantage of using a threaded plug 1189 as shown are ease of assembly, and of disassembly for cleaning, if needed. Another advantage is that the plug 1189 allows for fine tuning of the switch actuator height to activate the "ON" switch 1184, described in more detail below. Thus, the plug 1189 preferably is set to a predetermined depth, which may be determined empirically and then applied to all like systems.

When the float rod 122 is at the top of its stroke within the actuator passage 1188, the switch actuator 1182 actuates an "ON" switch 1184, and when the float rod 122 is at the bottom of its stroke within the actuator passage 1188, the switch actuator 1182 actuates an "OFF" switch 1186. An "ON" signal and an "OFF" signal are transmitted respectively through signal lines 1185 and 1187. The signal lines 1185 and 1187 together form a signal cable 1181 (see FIG. 1) through which the signals are transmitted to the power supply switch 500, turning power to the air pump 200 and the purge valve 300 on or off accordingly. The signals may, for example, be sent to a relay (not shown) in the power supply switch 500, and the relay may accomplish the switching as appropriate. The relay is preferably a latching relay, so that it will keep the air pump 200 running, even after the switch actuator 1182 leaves the vicinity of the "ON" switch 1184, until the switch actuator 1182 reaches the vicinity of the "OFF" switch 1186. Alternatively, a microprocessor or the like may be provided within the power supply switch 500 as a controller to receive the "ON" and "OFF" signals, and the microprocessor may control the switching.

If desired, the purge valve 300 and purge line 320 may be eliminated in, for example, the following manner. A separate sensor, such as a flow switch, acoustic sensor or the like may be provided to detect flow of water through the outlet line 330. This sensor would send a signal to the switch of the air pump 200 to indicate whether water was flowing through the outlet line 330. Actuation of the air pump 200 would then occur when (1) the "ON" signal was received from the switch assembly 118 and (2) when a "water flowing" signal was received from the flow sensor. In other words, when water was flowing because a faucet 3302 or the like was turned on, the system would know that it was possible to force more air into the tank 100, and therefore would actuate the air pump 220 if the float 120 indicated that more air was needed in the tank 100 at that time. The switching in this case would be slightly more complicated than in the case of using the purge valve 300, but could still be accomplished by those skilled in the art by using a relay or a microprocessor or the like.

The buoyancy of the float 120, the length of the float rod 122, and the distance between the switches 1184 and 1186 are preferably selected in such a combination that the water level does not drop below about twenty-seven inches when the air head 150 is at its maximum height, and does not raise above about fourteen inches before the air pump 200 is actuated to recharge the air head 150. Of course, these distances may change depending on the size, specific requirements or the like of a given system. It has been discovered that a long, slender float 120 is more advantageous than, for example, a short, fat float, for the reason that by using a long, slender float, the distance between the minimum and maximum height of the air head 150 can be made greater than the distance between the switches 1184 and 1186. As one example, a cylindrical float that is one inch in diameter, eighteen inches in length and has a mass of about 113 g (approximately 4 ounces) enables the distance between the minimum and maximum height of the air head 150 to be as much as twelve inches or more, even though the distance between the switches 1184 and 1186 is only about four inches. This is advantageous because it reduces the cycle time of the air pump 200. In other words, if there were only a short distance between the minimum and maximum height of the air head 150, then the air pump 200 would need to be turned on more often to recharge the air head 150. It is contemplated that the optimum aspect ratio of the float 120, i.e., the ratio of the float's diameter to the float's height, is within a range of from about 1:10 to about 1:30, preferably about 1:15 to about 1:25, and more preferably about 1:18. However, any other desired aspect ratio of the float may still be used within the scope of the invention.

In a preferred embodiment, the switch actuator 1182 is a magnet, and the switches 1184 and 1186 are magnetically actuated switches. Thus, the switches 1184 and 1186 may be completely embedded within the cap 100, and need not be exposed to the atmosphere or to the inside of the tank 100. However, other embodiments are also possible, such as an embodiment (not shown) in which the switch actuator 1182 is simply a projection projecting from the float rod 122, and the projection physically contacts the switches, which in this case may be microswitches or the like.

Some advantages of the system described above include:

The system does not require a vent, because air is proportionately added, and overcharging with air will not occur. Therefore, in contrast to water treatment systems that use a vent, there are no problems of leaking or clogged mechanical or electronic vents.

Water exiting from the purge valve is clean, filtered water, and therefore is less likely to cause clogging or malfunctioning of the purge valve.

The introduction of air into the tank is based directly on water level; therefore, it is not actuated too frequently or too infrequently, as is the tendency with timer, flow switch or pressure switch-based systems.

While the invention has been described in conjunction with the specific embodiments described above, these embodiments should be viewed as illustrative and not limiting. Various modifications, improvements, substitutes or the are possible within the spirit and scope of the invention.

For example, while the cap 110 is shown and described as including the inlet port 112, the outlet port 114, the air inlet port 115 and the switch assembly 118, any or all of these elements may be provided elsewhere, such as in a side or top wall of the tank 100. However, it is typically much more convenient, in terms of both manufacturing and installation, to include these elements in the cap 110 as shown.

What is claimed is:

1. A fluid treatment system, comprising:

a pressurizable tank;

a fluid inlet leading into the tank;

a fluid outlet leading out of the tank, the fluid outlet being connected to a faucet;

an air inlet leading into the tank;

a compressed air source connected to the air inlet;

a float disposed inside the tank, the float rising or falling in response to a level of fluid in the tank;

a float-actuated switch assembly connected to the float, the float-actuated switch assembly outputting an "ON" signal when the float is at a high position and outputting an "OFF" signal when the float is at a low position, the "ON" signal starting introduction of compressed air into the tank via the air inlet, and the "OFF" signal stopping the introduction of compressed air into the tank via the air inlet without requiring use of a timer; and a purge valve that is openable in response to the "ON" signal to allow fluid to flow out of the tank during the introduction of compressed air into the tank, the purge valve being connected to the fluid outlet, the fluid outlet having an opening that is substantially below a minimum level of the float.

2. The system of claim 1, wherein the float-actuated switch assembly comprises:

a switch actuator connected to the float, the switch actuator being movable within an actuator passage;

an "ON" switch located near a first end of the actuator passage;

an "OFF" switch located near a second end of the actuator passage;

wherein the "ON" switch outputs the "ON" signal when the switch actuator contacts or moves into the vicinity of the "ON" switch, and the "OFF" switch outputs the "OFF" signal when the switch actuator contacts or moves into the vicinity of the "OFF" switch.

3. The system of claim 2, wherein the switch actuator is a magnet, and the "ON" switch and the "OFF" switch are magnetically actuated switches.

4. The system of claim 1, further comprising:

a cap assembly comprising (i) a cap that is attachable to the tank and (ii) the float-actuated switch assembly, wherein the float-actuated switch assembly comprises:

a switch actuator connected to the float, the switch actuator being movable within an actuator passage formed within the cap;

an "ON" switch located near a first end of the actuator passage;

an "OFF" switch located near a second end of the actuator passage;

wherein the "ON" switch outputs the "ON" signal when the switch actuator contacts or moves into the vicinity of the "ON" switch, and the "OFF" switch outputs the "OFF" signal when the switch actuator contacts or moves into the vicinity of the "OFF" switch.

5. The system of claim 4, wherein the switch actuator is a magnet, and the "ON" switch and the "OFF" switch are magnetically actuated switches.

6. The system of claim 5, wherein the "ON" switch and the "OFF" switch are completely embedded within the cap.

7. The system of claim 1, wherein the air source comprises an air pump, and the air pump is turned on in response to the "ON" signal and turned off in response to the "OFF" signal.

8. The system of claim 7, wherein the air pump and the purge valve are actuated by a same switch.

9. The system of claim 7, wherein the air pump and the purge valve are connected to a same power source.

10. The system of claim 1, wherein the float has an aspect ratio in a range of from about 1:10 to about 1:30.

11. The system of claim 1, wherein the float has an aspect ratio in a range of from about 1:15 to about 1:25.

12. The system of claim 1, further comprising a cap that attaches to the tank; wherein the float-actuated switch assembly comprises:

a switch actuator connected to the float, the switch actuator being movable within an actuator passage formed within the cap;

an "ON" switch located near a first end of the actuator passage; and an "OFF" switch located near a second end of the actuator passage;

wherein a distance between a minimum and a maximum height of the level of fluid is greater than a distance between the "ON" switch and the "OFF" switch.

13. A fluid treatment system, comprising:

a pressurizable tank;

a fluid inlet leading into the tank;

a fluid outlet leading out of the tank;

an air inlet leading into the tank;

a compressed air source connected to the air inlet;

a float disposed inside the tank, the float rising or falling in response to a level of fluid in the tank;

a float-actuated switch assembly connected to the float, the float-actuated switch assembly outputting a signal when the float is at a high position, the signal starting introduction of compressed air into the tank via the air inlet; and a purge valve that is openable in response to the signal to allow fluid to flow out of the tank during the introduction of compressed air into the tank, the purge valve being connected to the fluid outlet, the fluid outlet having an opening that is substantially below a minimum level of the float.

14. The system of claim 13, wherein a filter tank is provided between the tank and the purge valve.

* * * * *